United States Patent [19]

Lunardon et al.

[11] Patent Number: 5,397,811
[45] Date of Patent: Mar. 14, 1995

[54] FLEXIBLE POLYURETHANE FOAMS AND PROCESS FOR PREPARING THEM

[75] Inventors: Gianflavio Lunardon; Dario Stefani, both of Padova, Italy

[73] Assignee: Enichem S.p.a., Milan, Italy

[21] Appl. No.: 47,359

[22] Filed: Apr. 19, 1993

Related U.S. Application Data

[63] Continuation-in-part of Ser. No. 792,912, Nov. 15, 1991, abandoned.

[30] Foreign Application Priority Data

Nov. 16, 1990 [IT] Italy ................................. 22091/90

[51] Int. Cl.$^6$ ............................................. C08G 18/10
[52] U.S. Cl. ................................... 521/159; 521/914; 521/174
[58] Field of Search ................................. 521/159, 914

[56] References Cited

U.S. PATENT DOCUMENTS

| | | | |
|---|---|---|---|
| 4,160,076 | 7/1979 | Guthrie et al. | 521/159 |
| 4,478,960 | 10/1984 | Buethe et al. | 521/159 |
| 4,668,708 | 5/1987 | Mueller et al. | 521/159 |
| 4,792,575 | 12/1988 | Takao et al. | 521/160 |

FOREIGN PATENT DOCUMENTS 1193243  5/1965  Germany ............................ 521/159

OTHER PUBLICATIONS

G. Oertel, *Polyurethane Handbook,* 1985, p. 201, New York.

*Primary Examiner*—John Kight, III
*Assistant Examiner*—R. Johnson
*Attorney, Agent, or Firm*—Oblon, Spivak, McClelland, Maier & Neustadt

[57] ABSTRACT

Flexible polyurethane foams having densities lower than 25 kg/m$^3$ and a load bearing capacity, at a 40% compression, higher than 150N, prepared by reacting a modified polyiso=cyanate with a compound containing active end hydrogens and wherein high levels of water are used as foaming agent, without risk of self-ignition.

12 Claims, No Drawings

FLEXIBLE POLYURETHANE FOAMS AND PROCESS FOR PREPARING THEM

This application is a continuation-in-part of application Ser. No. 07/792,912, filed on Nov. 15, 1991, now abandoned.

The present invention relates to flexible polyurethane foams and to the process for preparing them.

More in particular the present invention relates to flexible polyurethane foams prepared by means of a process, which does not involve the use of secondary foaming agents of chlorofluoroalkane nature, to the process for preparing them and to the special intermediates used to this purpose.

The technique for producing polyurethane foams is known since long: it consists in reacting polyether polyols or polyester polyols with polyisocyanates, in the presence of catalysts, foaming agents, cell-regulating surfactants, stabilizers and other auxiliary products.

The polyether polyols utilized at present for producing flexible polyurethane foams are prepared by condensing one or more alkylene oxides on compounds having at least two active hydrogen atoms, such as for example glycols, triols, tetraols, amines and mixtures thereof.

The most broadly utilized alkylene oxides are the ethylene and propylene oxides, which are used either alone or in admixture.

European patent publication 398,304 describes the preparation of flexible polyurethane foams by means of a process which does not require the use of foaming agents of chlorofluoroalkane nature. More in particular, the above-cited patent application describes flexible polyurethane foams having densities ranging from 15 to 60 kg/m$^3$ and a load bearing capacity, at a 40% compression according to standard ISO 2439, ranging from 50 to 150N, prepared by using only carbon dioxide as a foaming agent. According to said patent application, foams having the above-mentioned characteristics can be prepared by reacting an isocyanic prepolymer of aromatic or cycloaliphatic nature, having a content of free NCO groups ranging from 10 to 45% by weight, with a polyether polyol obtained from the condensation of propylene oxide and ethylene oxide and having an ethylene oxide content ranging from 10 to 90% by weight.

The Applicant has now found that it is possible to increase the load bearing capacity of flexible polyurethane foams, having very low densities, to values higher than 150N, i.e. starting from 151N, using only $CO_2$, from isocyanate and water reaction as foaming agent, and without risk of self-ignition, if a polyether polyols having ethylene oxide contents lower than 50% by weight and particular molecular weights are used as polyurethane reagents.

Thus, it is an object of the present invention to provide flexible polyurethane foams having a load bearing capacity higher than 150N, according to standard ISO 2439 at 40% of compression, obtained, in the presence of a foaming agent of non chlorofluoroalkane nature, and according to the free expansion technique, from the reaction between a modified polyisocyanate and a compound containing end activated hydrogens, wherein the modified polyisocyanate has a content of free NCO groups ranging from 10 to 45% by weight, preferably from 15 to 40% by weight, and is prepared by partial polymerization of an organic polyisocyanate, having an isocyanic functionality of at least 2, with at least a polyol polyether having a molecular weight from 500 to 8,000, preferably from 1,000 to 6,000, having a hydroxyl functionality ranging from 2 to 4, and wherein the compound containing active end hydrogens comprises at least a polyether polyol obtained by condensation of propylene oxide and ethylene oxide, with an ethylene oxide content below 50% by weight, preferably ranging from 0 to 25% by weight, and having:

a) a hydroxyl functionality ranging from 2 to 4;
b) an equivalent weight from 500 to 2,500 per end hydroxyl group;

on condition that, when the polyether polyol of the compound containing active end hydrogens has an ethylene oxide content from 0 to 10% by weight, preferably from 0 to 9.9%, its equivalent weight ranges from 500 to 2,500, while when its ethylene oxide content is from 10 to 50% by weight, preferably from 10 to 25%, its equivalent weight ranges from 1,000 to 1,500.

According to the present invention, the foaming agent preferably consists only of carbon dioxide, while the equivalent ratio between modified polyisocyanate and compound containing active end hydrogens ranges from 0.8 to 1.2 or, more preferably, from 0.95 to 1.15.

Any organic polyisocyanate capable of providing polyurethane foams can be utilized in the embodiment of the present invention, although the aromatic, cycloaliphatic polyisocyanates and the corresponding alkyl-substituted derivatives are preferred.

In particular it is possible to utilize low molecular weight diisocyanates of general formula:

$$OCN-R-NCO \qquad (I)$$

where R represents a cycloaliphatic radical, an aromatic radical, optionally alkyl-substituted, having 5 to 25 carbon atoms, such as meta- and/or para-phenylenediisocyanate, 2,4-toluenediisocyanate either alone or in admixture with its isomer 2,6-toluenediisocyanate, 4,4'-diphenylmethanediisocyanate, optionally in admixture with its isomer 2,4'-diphenylmethanediisocyanate, 4,4'-dicyclohexylmethanediisocyanate, 1-isocyanate-3-isocyanatemethyl-3,3,5-trimethyl-cyclohexane (or isophoronediisocyanate), etc.

The preferred diisocyanate of general formula (I) is 2,4-toluenediisocyanate either alone or in admixture with at least 20% by weight of isomer 2,6-toluenediisocyanate.

Undistilled or rough toluenediisocyanate, i.e. a partially purified toluenediisocyanate withdrawn from any tray of the distillation column can be usually utilized.

As an alternative, it is possible to utilize mean or high molecular weight polyisocyanates having different condensation degrees obtained from the phosgenization of aniline-formaldehyde condensates. These products are composed of mixtures of polymethylene-polyphenyl-polyisocyanates having general formula:

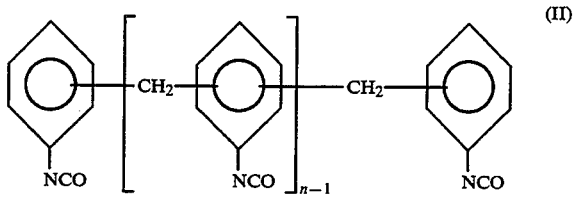

(II)

where n represents an integer higher than or equal to 1.

Preferred mean or high molecular weight polyisocyanates are the mixtures of polymethylene-polyphenyl-polyisocyanates having an average functionality of 2.6–2.8; these products are marketed under various trade marks such as "Tedimon 31" of company ENICHEM POLIMERI, "Suprasec DNR" of company I.C.I., or "Desmodur 44 V20" of company Bayer.

The compounds containing end activated hydrogens, to be used the preparation of the polyurethane foams of the present invention, preferably consist of mixtures of water and polyols obtained by the condensation of propylene oxide, optionally in the presence of ethylene oxide.

The condensation is made to occur on compounds (starters) having at least two active end hydrogen atoms, such as glycols, triols, tetraols, etc., amines, alkanolamines and polyamines or mixtures thereof.

Representative examples of polyether polyols to be utilized according to the present invention in the compound containing active end hydrogens are the ones terminated with propylene oxide or with ethylene oxide and in which the starter is a glycol such as dipropyleneglycol, a triol such as glycerine or trimethylolpropane, a tetraol such as pentaerythritol, a diamine such as ethylenediamine, an alkanolamine such as triethanol amine, etc., or mixtures of two or more of the abovementioned compounds.

These polyols can be utilized as such or they can contain polymeric particles either in dispersion or partially grafted on the polyol chains, said polymeric particles having sizes below 20 microns. Suitable polymers for preparing these particles are: polyacrylonitrile, polystyrene, polyvinyl-chloride, etc., or mixtures or copolymers thereof, or polymers based on urea such as the "Polyharnstoff-Dispersionen" or "PHD Polyolen" of the firm Bayer.

Likewise, the polyether polyols utilized for preparing the modified polyisocyanate to be used in the preparation of the foams of the present invention are obtained from the polycondensation of olefinic oxides having 2 to 6 C on a starter comprised in the above-described class.

In particular it is possible to use polyether polyols containing polypropylene oxide either alone or in admixture with ethylene oxide amounts higher than 4% by weight.

Both the polyether polyols utilized in the compounds containing active end hydrogens and the polyether polyols utilized in the preparation of the modified polyisocyanates are preparable by means of processes which are known to those skilled in the art and described, for example, in "Saunders and Frisch—Polyurethanes, Chemistry and Technology", Interscience, New York, 1964.

In the preparation of the polyurethane foams of the present invention, the water amount which can be used in the compound containing active end hydrogens is critical, as water, through the reaction with polyisocyanates, gives rise to the generation of carbon dioxide, which causes the foaming of the polyurethane resin. Water amounts higher than about 3 parts by weight, preferably from 3.5 to 6 parts, with respect to 67.5 parts of polyol contained in said compound are the most commonly used.

This a very surprising result because it is known, e.g., from "Polyurethane" Kunstoff Handbuch 7, page 190, that the amounts of water, in water expanded plyurethane foams, cannot exceed the above said limit; otherwise self-ignition of the foam or scorching phenomena might occur.

According to the present invention, the foaming agent preferably utilized for the polyurethane resin is the carbon dioxide formed in situ by the chemical reaction between water and the free NCO groups of the modified polyisocyanate. This method of introducing the foaming gas into the polymerization mass is not to be considered as limitative, since other gases and other techniques can be used—for example bubbling of air, $CO_2$, nitrogen, etc., into the reaction mass by injection of said gases from the outside, under pressure—which are always within the scope of the present invention.

The flexible polyurethane foams of the present invention can be prepared through the free expansion technique and by means of a two-step process which comprises:

a) reacting a polyisocyanate of general formula (I) or (II) with at least a polyether polyol having a molecular weight ranging from 500 to 8,000, preferably from 1,000 to 6,000, having a hydroxyl functionality ranging from 2 to 4 in order to obtain a modified polyisocyanate having a free NCO group content ranging from 10 to 45% by weight, preferably from 15 to 40%; and b) reacting the resulting modified polyisocyanate with a compound containing active end hydrogens and comprising at least a polyol polyether obtained from the condensation of propylene oxide and ethylene oxide, with the ethylene oxide content being lower than 50% by weight, preferably ranging from 0 to 25%, and having:

i) a hydroxyl functionality ranging from 2 to 4;
ii) an equivalent weight ranging from 500 to 2,500 per end hydroxyl group;

on condition that, when the polyether polyol of the compound containing active end hydrogens has an ethylene oxide content from 0 to 10% by weight, preferably from 0 to 9.9%, its equivalent weight ranges from 500 to 2,500, while when its ethylene oxide content ranges from 10 to 50% by weight, preferably from 10 to 25%, its equivalent weight ranges from 1,000 to 1,500; and in which agents other than chlorofluoroalkanes are used as foaming agents.

The free expansion technique is described in Saunders and Frisch, above-cited.

The reactions of step a) are generally conducted from 50° to 90° C. without catalyst, while the reactions of step b) are conducted at room temperature and in the presence of aminic catalysts, such as triethylenediamine, and/or metal catalysts such as stannous octoate, and other additives such as cell modifiers, thermo-oxidation stabilizers, pigments, etc.

The flexible polyurethane foams forming the object of the present invention have a density lower than 25 kg/m$^3$, generally from 15 to 23 kg/m$^3$, and a load bearing capacity, according to standard ISO 2439 at 40% of compression, higher than 150N, generally starting from 151 up to 300N, and therefore they are endowed with such caracteristics as to meet, on one side, the requirements of the furniture, furnishing, automotive industry, etc., which require foams having the abovesaid physical properties, while, on the other side, they do not involve the use of foaming agents such as chlorofluoroalkanes, which are harmful for the environment.

The following examples are given to better illustrate but not to limit the present invention.

The amounts of the various components of the formulations are expressed as parts by weight, unless otherwise specified.

EXAMPLE 1

A modified polyisocyanate having a free NCO group content of about 27% was prepared by reacting 58.3 parts of toluenediisocyanate, having a ratio of isomers 2,4 to isomers 2,6 equal to 80/20, with 41.7 parts of a trifunctional polyether polyol having a molecular weight equal to 3,500 prepared by polymerization of ethylene oxide (A) and propylene oxide (B) on glycerine with A/B ratios being equal to 10/90.

90.7 parts of the modified polyisocyanate so obtained were reacted with 5.4 parts of water and with 67.5 parts of a trifunctional polyether polyol having a molecular weight equal to 3,500 and a number of OH equal to 48 mg KOH/g obtained by condensation of propylene oxide on glycerine.

The mixture consisting of modified polyisocyanate+polyether polyol/water was reacted according to known techniques in the presence of a catalyst such as triethylenediamine and stannous octoate, and of a silicone surfactant, was stirred for a few seconds and then was utilized for preparing flexible foamed products having a density of about 18.5 g/l, a load bearing capacity, at 40% of compression according to standard ISO 2439, of about 170N, an elongation at break of 320% and a permanent set index (according to standard ISO 1856) of 4%. No thermal degradation effect was observed on the final foam.

EXAMPLE 2

92 parts of the modified polyisocyanate of example 1 were reacted with 4.7 parts of water and with 67.5 parts of a polyol polyether, obtained from propylene oxide, having a functionality of 3.5, a molecular weight of 3,500 and a number of OH equal to 56.

There were obtained flexible foamed products having a density of about 21.2 g/l, a load bearing capacity, at 40% of compression according to standard ISO 2439, of about 200N, an elongation at break of 300% and a permanent set index of 3.2%. No thermal degradation effect was observed on the foam.

EXAMPLE 3 (COMPARATIVE TEST)

58.3 parts of toluenediisocyanate containing 20% by weight of isomer 2,6 were reacted with 5.4 parts of water and 109.2 parts of trifunctional polyether polyol having a molecular weight of 3,500 and a number of OH equal to 48 (the same as used in example 1) in the presence of triethylenediamine, stannous octoate and a silicone surfactant. A flexible foam having a density of 19.5 g/l was obtained, which, however, exhibited evident scorching phenomena.

5 parts of foaming agent CFC 11 were then added to the reacting polyurethane mixture in order to obtain a foamed product having the same density as the foam of example 1 and without scorching, a load bearing capacity of 110N, an elongation at break of 240% and a permanent set index of 4.6%.

We claim:

1. Flexible polyurethane foams having densities lower than 25 kg/m³ and a bearing capacity higher than 150N according to standard ISO 2439 at 40% of compression, prepared by reacting, in the presence of carbon dioxide formed in situ and according to the free expansion technique, a modified polyisocyanate and a compound containing active end hydrogens, in which the modified polyisocyanate has a free NCO group content ranging from 10 to 45% by weight, and is obtained from the partial polymerization of an organic polyisocyanate having an isocyanic functionality of at least 2, with at least one polyether polyol having a molecular weight ranging from 500 to 8,000, having a hydroxyl functionality from 2 to 4, and in which the compound which contains active end hydrogens comprises at least one polyether polyol obtained from the condensation of propylene oxide and ethylene oxide, with an ethylene oxide content lower than 50% by weight, and having:
   a) a hydroxyl functionality ranging from 2 to 4;
   b) an equivalent weight ranging from 500 to 2,500 per end hydroxyl group;
on condition that, when the polyether polyol of the compound containing active end hydrogens has an ethylene oxide content ranging from 0 to 10% by weight, its equivalent weight ranges from 500 to 2,500, while when its ethylene oxide content ranges from 10 to 50% by weight, its equivalent weight ranges from 1,000 to 1,500.

2. The polyurethane foams according to claim 1, wherein the equivalent ratio between modified polyisocyanate and the compound containing active end hydrogens ranges from 0.8 to 1.2.

3. The polyurethane foams according to claim 1, wherein the organic polyisocyanate is selected from the diisocyanates of general formula (I):

$$OCN-R-NCO \qquad (I)$$

where R represents a cycloaliphatic radical, an aromatic radical optionally alkyl-substituted, having from 5 to 25 carbon atoms.

4. The polyurethane foams according to claim 1, wherein the organic polyisocyanate is selected from the mean or high molecular weight products having different condensation degrees, obtained from the phosgenization of aniline-formaldehyde condensates and consisting of mixtures of polymethylene-polyphenyl-polyisocyanates of general formula (II):

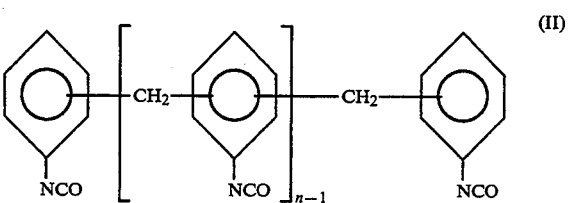

where n is 1 or more.

5. The polyurethane foams according to claim 2, wherein the organic polyisocyanate is 2,4-toluenediisocyanate either alone or in admixture with at least 20% by weight of isomer 2,6.

6. The polyurethane foams according to claim 1, wherein the compound which contains active end hydrogens is composed of mixtures of water and polyols obtained from the condensation of propylene oxide mixtures, optionally in the presence of ethylene oxide, on compounds having at least two active hydrogen atoms.

7. The polyurethane foams according to claim 5, wherein a water amount higher than about 3 parts by weight with respect to 67.5 parts of polyol is used.

8. The polyurethane foams according to claim 1, wherein the polyether polyols utilized for preparing the modified polyisocyanate are obtained from the polycondensation of $C_2$–$C_6$ alkylene oxides on compounds having at least two active hydrogen atoms.

9. The polyurethane foams according to claim 1, having a density ranging from 15 to 23 kg/m$^3$ and a load bearing capacity, according to standard ISO 2439, at 40% of compression, higher than 150N.

10. The polyurethane foams according to claim 9, having a load bearing capacity from 151N up to 300N.

11. A process for preparing polyurethane foams having densities lower than 25 kg/m$^3$ and a bearing capacity higher than 150N according to the free expansion technique, which comprises:

a) reacting a polyisocyanate of general formula (I):

OCN—R—NCO    (I)

or general formula (II):

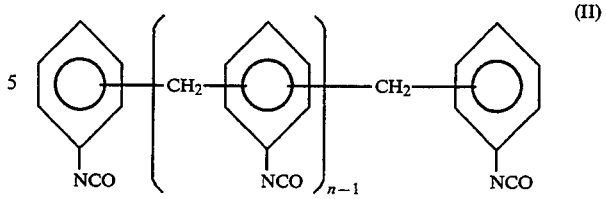

where n is one or more, with at least one polyether polyol having a molecular weight from 500 to 8,000, and a hydroxyl functionality from 2 to 4, to obtain a modified polyisocyanate having a content of free NCO groups ranging from 10 to 45% by weight; and b) reacting the modified polyisocyanate so obtained with a compound containing active end hydrogens, which comprises at least one polyether polyol obtained from the condensation of propylene oxide and ethylene oxide, with an ethylene oxide content lower than 50% by weight, and having:
  i) a hydroxyl functionality ranging from 2 to 4;
  ii) an equivalent weight ranging from 500 to 2,500 per end hydroxyl group;

on the condition that, when the polyether polyol of the compound containing active end hydrogens has an ethylene oxide content ranging from 0 to 10% by weight, its equivalent weight ranges from 500 to 2,500, while when its ethylene oxide content ranges from 10 to 50% by weight, its equivalent weight ranges from 1,000 to 1,500, wherein the foaming agent is carbon dioxide generated in situ.

12. The process according to claim 11, wherein the reactions of step (a) are conducted from 50° to 90° C. without catalyst, while the reactions of step (b) are conducted at room temperature and in the presence of aminic and/or metal catalysts, cell regulators, thermooxidation stabilizers, or pigments.

* * * * *